(12) United States Patent
Liu et al.

(10) Patent No.: US 12,108,197 B2
(45) Date of Patent: Oct. 1, 2024

(54) CAMERAS AND IMAGE OBTAINING METHODS BASED ON CONTROLLING BRIGHTNESS ADJUSTMENT PARAMETERS (71) Applicant: HUAWEI TECHNOLOGIES CO., LTD., Guangdong (CN)

(72) Inventors: Jun Liu, Shanghai (CN); Zhipeng Deng, Shanghai (CN); Han Pan, Shanghai (CN); Shengkai Yang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 17/974,302

(22) Filed: Oct. 26, 2022

(65) Prior Publication Data

US 2023/0049248 A1 Feb. 16, 2023

Related U.S. Application Data (63) Continuation of application No. PCT/CN2020/087878, filed on Apr. 29, 2020.

(51) Int. Cl.
H04N 9/77 (2006.01)
H04N 23/55 (2023.01)

(52) U.S. Cl.
CPC ............... H04N 9/77 (2013.01); H04N 23/55 (2023.01)

(58) Field of Classification Search
CPC .......... H04N 9/77; H04N 23/55; H04N 5/265; H04N 23/71; H04N 23/11; H04N 23/12
See application file for complete search history.

(56) References Cited

U.S. PATENT DOCUMENTS 8,755,597 B1\* 6/2014 Tantalo .................. H04N 23/45
382/284
11,057,592 B2\* 7/2021 Pu .......................... H04N 23/88
(Continued)

FOREIGN PATENT DOCUMENTS

CN 108419061 A 8/2018
CN 108419062 A 8/2018
(Continued)

OTHER PUBLICATIONS

Extended European Search Report in European Appln No. 20933350.9, dated Apr. 17, 2023, 6 pages.
(Continued)

Primary Examiner — Gevell V Selby
(74) Attorney, Agent, or Firm — Fish & Richardson P.C.

(57) ABSTRACT

A first light beam can be collected by using an optical module. A second light beam can be obtained based on the first light beam. An image sensor can perform photoelectric conversion on the infrared light beam that is in the second light beam and that is irradiated to the first channel to obtain a first electrical signal. Photoelectric conversion can be performed on the visible light beam that is in the second light beam and that is irradiated to the second channel to obtain a second electrical signal. An initial image can be generated based on the first electrical signal and the second electrical signal. A color image and a grayscale image can be sent to an image processor. The image processor can receive the color image and the grayscale image. Fusion processing can be performed on the color image and the grayscale image to obtain a fused image.

19 Claims, 5 Drawing Sheets (56) References Cited

U.S. PATENT DOCUMENTS

| | | | |
|---|---|---|---|
| 2013/0329101 A1* | 12/2013 | Choi | H04N 25/131 |
| | | | 348/273 |
| 2014/0168444 A1 | 6/2014 | Bae et al. | |
| 2017/0064222 A1 | 3/2017 | Nakamura | |
| 2019/0378258 A1* | 12/2019 | Fan | H04N 25/131 |
| 2019/0387150 A1 | 12/2019 | Iwakura | |

FOREIGN PATENT DOCUMENTS

| | | |
|---|---|---|
| CN | 108965654 A | 12/2018 |
| CN | 109688317 A | 4/2019 |
| CN | 109951646 A | 6/2019 |
| CN | 110798623 A | 2/2020 |
| EP | 3582490 A1 | 12/2019 |
| WO | 2013183886 A1 | 12/2013 |

OTHER PUBLICATIONS

International Search Report and Written Opinion in International Appln. No. PCT/CN2020/087878, mailed on Jan. 20, 2021, 15 pages (with English translation).

\* cited by examiner

| X1 | R1 | X1 | Gr1 | X1 | R1 | X1 | Gr1 |
|----|----|----|-----|----|----|----|-----|
| R2 | X2 | Gr2 | X2 | R2 | X2 | Gr2 | X2 |
| X1 | Gb1 | X1 | B1 | X1 | Gb1 | X1 | B1 |
| Gb2 | X2 | B2 | X2 | Gb2 | X2 | B2 | X2 |
| X1 | R1 | X1 | Gr1 | X1 | R1 | X1 | Gr1 |
| R2 | X2 | Gr2 | X2 | R2 | X2 | Gr2 | X2 |
| X1 | Gb1 | X1 | B1 | X1 | Gb1 | X1 | B1 |
| Gb2 | X2 | B2 | X2 | Gb2 | X2 | B2 | X2 |

FIG. 3

| R1 | R2 | Gr1 | Gr2 |
|----|----|-----|-----|
| R3 | X | Gr3 | X |
| Gb1 | Gb2 | B1 | B2 |
| Gb3 | X | B3 | X |

FIG. 4

| R1 | X1 | Gr1 | X1 |
|----|----|-----|----|
| X2 | R2 | X2 | Gr2 |
| Gb1 | X1 | B1 | X1 |
| X2 | Gb2 | X2 | B2 |

FIG. 5

| X1 | R1 | X1 | Y1 |
|----|----|----|----|
| R2 | X2 | Y2 | X2 |
| X1 | Y1 | X1 | B1 |
| Y2 | X2 | B2 | X2 |

FIG. 6

| M1 | M2 | Y1 | Y2 |
|----|----|----|----|
| M3 | X | Y3 | X |
| Y1 | Y2 | C1 | C2 |
| Y3 | X | C3 | X |

| | |
|---|---|
| Collect a first light beam by using an optical module, and obtain a second light beam based on the first light beam, where the second light beam includes a visible light beam and an infrared light beam | 1201 |
| Perform, by an image sensor based on a brightness adjustment parameter corresponding to a first channel of the image sensor, photoelectric conversion on the infrared light beam that is in the second light beam and that is irradiated to the first channel, to obtain a first electrical signal; and perform, based on a brightness adjustment parameter corresponding to a second channel of the image sensor, photoelectric conversion on the visible light beam that is in the second light beam and that is irradiated to the second channel, to obtain a second electrical signal, where a value of the brightness adjustment parameter corresponding to the first channel is different from a value of the brightness adjustment parameter corresponding to the second channel | 1202 |
| Generate an initial image of a target object based on the first electrical signal and the second electrical signal, and send a color image and a grayscale image to an image processor based on the initial image | 1203 |
| Receive the color image and the grayscale image by the image processor, and perform fusion processing on the color image and the grayscale image to obtain a fused image | 1204 |

FIG. 12

CAMERAS AND IMAGE OBTAINING METHODS BASED ON CONTROLLING BRIGHTNESS ADJUSTMENT PARAMETERS

CROSS-REFERENCE TO RELATED APPLICATIONS

This application is a continuation of International Application No. PCT/CN2020/087878, filed on Apr. 29, 2020, the disclosure of which is hereby incorporated by reference in its entirety.

TECHNICAL FIELD

This application relates to the field of image shooting technologies, and in particular, to a camera and an image obtaining method.

BACKGROUND

With the development of image shooting technologies, people have increasingly high requirements on quality of images. In a low-illuminance environment with relatively low illuminance, a quantity of photons entering a sensor is relatively small. As a result, quality of an obtained image is relatively poor. How to obtain a high-quality image in the low-illuminance environment is a key problem to be resolved urgently in the video monitoring field.

For this, an apparatus for obtaining an image in a low-illuminance environment is provided in the related technology. The apparatus includes a lens, a light-splitting prism, two image sensors, and an image signal processing (ISP) element. The two image sensors are respectively located on two sides of the light-splitting prism, and the two image sensors are perpendicular to each other. When an image is obtained, a light beam passes through the lens and arrives at the light-splitting prism, and the light-splitting prism divides the light beam into an infrared light beam and a visible light beam that are perpendicular to each other. One of the two image sensors is configured to receive the infrared light beam and perform photoelectric conversion, and the other is configured to receive the visible light beam and perform photoelectric conversion. Subsequently, the ISP element performs signal processing on electrical signals that are obtained through photoelectric conversion performed by the two image sensors, and then a fusion chip fuses two images processed by the ISP element into one image, so that a high-quality image is obtained.

However, in the related technology, cooperation between the light-splitting prism and the two image sensors is required to enable the two image sensors to respectively receive the infrared light beam and the visible light beam. Therefore, locations of the light-splitting prism and the two image sensors need to be accurately calibrated in a processing process, and a slight deviation causes obvious impact on a final image fusion effect. Consequently, an image obtaining apparatus provided in the technology is relatively difficult to manufacture, and a yield rate is low. In addition, in the technology, a light-splitting prism and two image sensors need to be used. As a result, production costs are high.

SUMMARY

Embodiments of this application provide a camera and an image obtaining method, to reduce costs of shooting an image in a low-illuminance scenario and improve a yield rate.

According to one aspect, a camera is provided. The camera includes an optical module, a single image sensor, and an image processor electrically connected to the image processor. The image sensor includes at least one first channel and at least one second channel, each of the at least one first channel and the at least one second channel includes a plurality of pixels, and pixels of different channels are different. In addition, each channel is independently controlled.

First, the optical module collects a first light beam, and obtains a second light beam including an infrared light beam and a visible light beam based on the first light beam, and sends the second light beam to the image sensor. Then, the image sensor performs, based on a brightness adjustment parameter corresponding to the first channel, photoelectric conversion on the infrared light beam that is in the second light beam and that is irradiated to the first channel, to obtain a first electrical signal. The image sensor further performs, based on a brightness adjustment parameter corresponding to the second channel, photoelectric conversion on the visible light beam that is in the second light beam and that is irradiated to the second channel, to obtain a second electrical signal. A value of the brightness adjustment parameter corresponding to the first channel is different from a value of the brightness adjustment parameter corresponding to the second channel. Next, the image sensor generates an initial image based on the first electrical signal and the second electrical signal, and sends a color image and a grayscale image to the image processor based on the initial image. After receiving the color image and the grayscale image, the image processor performs fusion processing on the color image and the gray scale image to obtain a fused image.

The camera provided in this embodiment of this application can separately image an infrared light beam and a visible light beam by using the single image sensor, and does not need to use a light-splitting prism. The camera has a simple structure and is easy to process, which helps improve a yield rate and reduce production costs. In addition, the first channel and the second channel included in the image sensor are independently controlled, and have respective corresponding brightness adjustment parameters. Therefore, the first channel may perform, based on the brightness adjustment parameter corresponding to the first channel, photoelectric conversion on the infrared light beam irradiated on the first channel, to obtain the first electrical signal. Correspondingly, the second channel may also perform, based on the brightness adjustment parameter corresponding to the second channel, photoelectric conversion on the visible light beam irradiated to the second channel, to obtain the second electrical signal. Subsequently, the initial image may be generated based on the first electrical signal and the second electrical signal, to send the color image and the grayscale image to the image processor based on the initial image. This ensures that the color image generated based on the visible light beam and the grayscale image generated based on the infrared light beam are pixel-level aligned. This can avoid "ghosting" in the generated fused image after the image processor fuses the grayscale image and the color image, and also avoid a case in which different channels affect each other because the different channels use a unified brightness adjustment parameter, so that a high-quality image can be obtained in a low-illuminance environment.

In an example embodiment, the optical module includes a band-pass optical filter. The band-pass optical filter is configured to filter the first light beam to obtain the infrared light beam and the visible light beam as the second light beam.

Because the band-pass optical filter can pass only a light beam of an allowed band, only an infrared light beam and a visible light beam of the first light beam can pass through the band-pass optical filter. This prevents a light beam of another band from being irradiated to the image sensor, then prevents the light beam of another band from affecting subsequent photoelectric conversion and fusion processing processes, and ensures quality of an image.

In an example embodiment, the infrared light beam includes a first infrared light beam in a band near 850 nm, and a second infrared light beam in a band near 750 nm.

An infrared light beam allowed to pass through by the band-pass optical filter includes infrared light beams of two different bands. Compared with that of the first infrared light beam, the hand of the second infrared light beam is closer to a band of the visible light beam, to implement a better light supplementation function on the visible light beam.

In an example embodiment, the image sensor is further configured to perform, based on the brightness adjustment parameter corresponding to the first channel, photoelectric conversion on the visible light beam that is in the second light beam and that is irradiated to the first channel, to obtain a second electrical signal.

In the second light beam, in addition to the infrared light beam in the second light beam that can be irradiated to the first channel, the visible light beam in the second light beam may also be irradiated to the first channel, and the first channel may perform photoelectric conversion on the visible light beam irradiated to the first channel, to obtain the second electrical signal.

In an example embodiment, the apparatus further includes a band-stop optical filter membrane. The band-stop optical filter membrane is disposed on a surface of the image sensor, and the band-stop optical filter membrane is configured to shield the infrared light beam in the second light beam, so that the visible light beam in the second light beam is irradiated to the second channel.

By using the band-stop optical filter membrane, the infrared light beam can be prevented from being irradiated to the second channel, and the infrared light beam is only allowed to pass through the first channel. Therefore, only a visible light beam in the second light beam can pass through the second channel, and the second channel performs photoelectric conversion on the visible light beam only according to a corresponding brightness adjustment parameter. Therefore, a color cast problem caused by impact of an infrared light beam on a visible light beam is avoided, and quality of an obtained image is ensured.

In an example embodiment, the image processor is further configured to adjust, based on brightness information of the grayscale image, the brightness adjustment parameter corresponding to the first channel, and adjust, based on brightness information of the color image, the brightness adjustment parameter corresponding to the second channel.

By analyzing the color image and the grayscale image, the image processor may determine improvements that need to be separately made to the brightness adjustment parameters corresponding to the first channel and the second channel, to adjust the brightness adjustment parameters corresponding to the first channel and the second channel. Therefore, the image sensor may subsequently perform photoelectric conversion on irradiated light beam by using adjusted brightness adjustment parameters corresponding to a plurality of channels, and the obtained first electrical signal and second electrical signal may be used to obtain an image with more uniform brightness and higher quality.

In an example embodiment, the brightness adjustment parameter includes at least one of exposure duration and a gain.

According to another aspect, an image obtaining method is provided. The method includes: collecting a first light beam by using an optical module, and obtaining a second light beam based on the first light beam, where the second light beam includes a visible light beam and an infrared light beam; performing, by an image sensor based on a brightness adjustment parameter corresponding to a first channel of the image sensor, photoelectric conversion on the infrared light beam that is in the second light beam and that is irradiated to the first channel, to obtain a first electrical signal; performing, based on a brightness adjustment parameter corresponding to a second channel of the image sensor, photoelectric conversion on the visible light beam that is in the second light beam and that is irradiated to the second channel, to obtain a second electrical signal, where a value of the brightness adjustment parameter corresponding to the first channel is different from a value of the brightness adjustment parameter corresponding to the second channel; and generating an initial image based on the first electrical signal and the second electrical signal, and sending a color image and a grayscale image to an image processor based on the initial image, where the first channel and the second channel are independently controlled, each channel includes a plurality of pixels, and pixels of different channels are different; and receiving the color image and the grayscale image by the image processor, and performing fusion processing on the color image and the grayscale image to obtain a fused image.

In an example embodiment, the optical module includes a band-pass optical filter, and the obtaining a second light beam based on the first light beam includes: filtering the first light beam by the band-pass optical filter to obtain the infrared light beam and the visible light beam as the second light beam.

In an example embodiment, the infrared light beam includes a first infrared light beam in a band near 850 nm, and a second infrared light beam in a band near 750 nm.

In an example embodiment, after the obtaining a second light beam based on the first light beam, the method further includes: performing, by using the image sensor based on the brightness adjustment parameter corresponding to the first channel, photoelectric conversion on the visible light beam that is in the second light beam and that is irradiated to the first channel, to obtain a second electrical signal.

In an example embodiment, a band-stop optical filter membrane is disposed on a surface of the image sensor, and the infrared light beam in the second light beam is shielded by the band-stop optical filter membrane, so that the visible light beam in the second light beam is irradiated to the second channel, and the infrared light beam in the second light beam is prevented from being irradiated to the second channel.

In an example embodiment, after the performing fusion processing on the color image and the gray scale image to obtain a fused image, the method further includes: adjusting, based on brightness information of the grayscale image, the brightness adjustment parameter corresponding to the first channel, and adjusting, based on brightness information of the color image, the brightness adjustment parameter corresponding to the second channel.

In an example embodiment, the brightness adjustment parameter includes at least one of exposure duration and a gain.

DESCRIPTION OF EMBODIMENTS

To make the objectives, technical solutions, and advantages of this application clearer, the following further describes the implementations of this application in detail with reference to the accompanying drawings.

Figure 1:
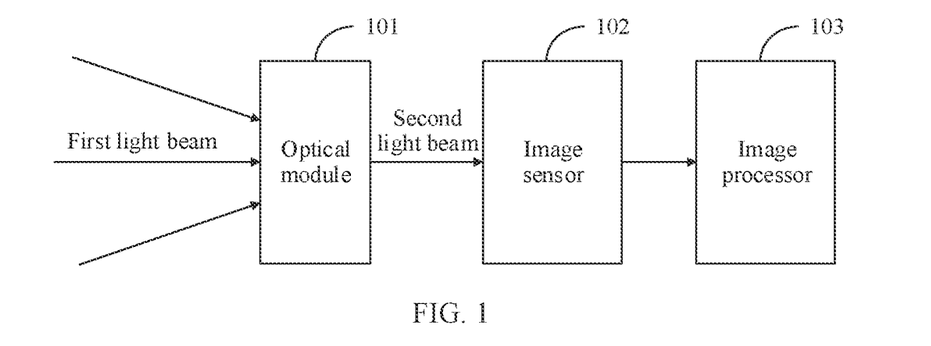
FIG. 1 is a structural diagram of a camera according to an embodiment of this application.

An embodiment of this application provides an image obtaining apparatus. Refer to FIG. 1. The apparatus includes an optical module 101, a single image sensor 102, and an image processor 103, The optical module 101 is configured to collect a first light beam, and send a second light beam to the image sensor 102 based on the first light beam. The second light beam includes a visible light beam and an infrared light beam.

The first light beam is a light beam corresponding to a target object, and the target object is an object whose image is to be shot. In response to a fact that the target object is a light source that can emit a light beam, the first light beam corresponding to the target object includes a light beam emitted by the target object. In response to a fact that the target object is a non-light source that cannot emit a light beam, the first light beam corresponding to the target object includes a reflected light beam obtained by reflecting, by the target object, a light beam emitted by another light source.

In an example embodiment, the optical module 101 includes one or more lens groups. After collecting the first light beam corresponding to the target object, the optical module 101 may change a light beam propagation direction of the first light beam by using the one or more lens groups, to obtain the second light beam. The second light beam includes the infrared light beam and the visible light beam. For example, the optical module 101 and the image sensor 102 may be disposed coaxially, so that the second light beam sent by the optical module 101 can be directly irradiated to the image sensor 102. Alternatively, the optical module 101 and the image sensor 102 may not be disposed coaxially. In this case, an optical element configured to change a light beam propagation direction may be further disposed between the optical module 101 and the image sensor 102, to change a propagation direction of the second light beam sent by the optical module 101, so that the second light beam passing through the optical element can still be irradiated to the image sensor 102 when the optical module 101 and the image sensor 102 are not disposed coaxially. For example, the optical element configured to change the light beam propagation direction may be a prism, and the optical element is not limited in this embodiment.

In an example embodiment, the image sensor 102 includes at least one first channel and at least one second channel, each of the at least one first channel and the at least one second channel includes a plurality of pixels, pixels of different channels are different, and each channel is independently controlled. Because the second light beam sent by the optical module 101 can be sent to the image sensor 102, the image sensor 102 may be configured to perform, based on the first channel, photoelectric conversion on the infrared light beam that is in the second light beam and that is irradiated to the first channel, to obtain a first electrical signal, and perform, based on the second channel, photoelectric conversion on the visible light beam that is in the second light beam and that is irradiated to the second channel, to obtain a second electrical signal.

The first channel and the second channel included in the image sensor 102 each correspond to a brightness adjustment parameter. The first channel and the second channel may be independently controlled based on respective corresponding brightness adjustment parameters. To be specific, when photoelectric conversion is performed, through the first channel, on the infrared light beam irradiated to the first channel, conversion is performed based on the brightness adjustment parameter corresponding to the first channel. Correspondingly, when photoelectric conversion is performed, through the second channel, on the visible light beam irradiated to the second channel, conversion is performed based on the brightness adjustment parameter corresponding to the second channel. It may be understood that, in this embodiment, a value of the brightness adjustment parameter corresponding to the first channel may be different from a value of the brightness adjustment parameter corresponding to the second channel. That is why the first channel and the second channel can be controlled separately and independently. Therefore, when a brightness adjustment parameter is used, any light beam does not need to be accommodated, but brightness adjustment parameters appropriate for different light beams may be used for the light beams. An electrical signal obtained by performing photoelectric conversion based on the relatively appropriate brightness adjustment parameter helps obtain a relatively high-quality image in a subsequent fusion processing process.

Figure 2:
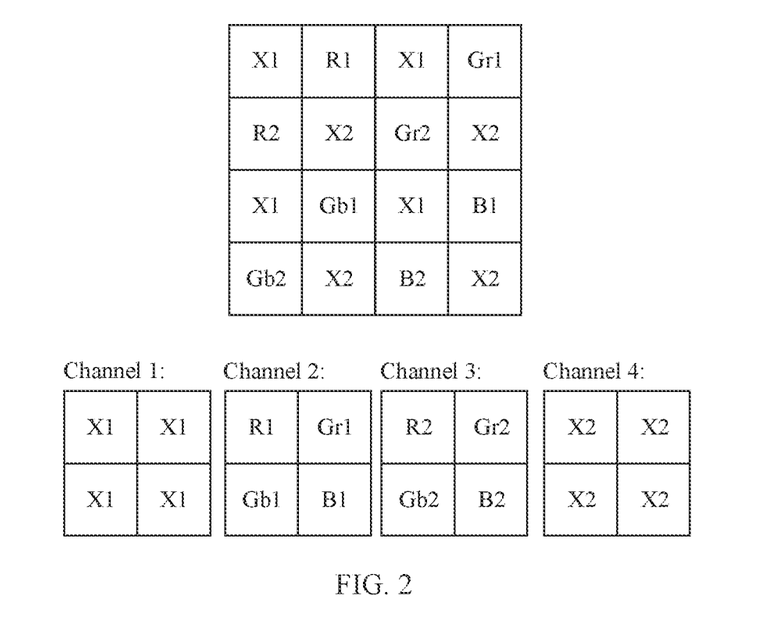
FIG. 2 is a schematic diagram of a pixel array according to an embodiment of this application.

For example, the image sensor 102 may include a pixel array. The pixel array includes a plurality of different pixels, Different pixels are combined to obtain a plurality of channels. Therefore, pixels of different channels are different. For example, the pixel array may include color pixels and X pixels. Refer to FIG. 2. Color pixels may include red pixels (R1 and R2, where R represents red), green pixels (Gr1, Gr2, Gb1, and Gb2, where both Gr and Gb represent green), and blue pixels (B1 and B2, where B represents blue). X pixels are X1 and X2. The pixel array shown in FIG. 2 may be considered as a pixel array in an RGBX pattern. In the pixel array shown in FIG. 2, four X1 pixels form a first channel through which an infrared light beam (or a full-band light beam) passes, and four X2 pixels form another first channel through which an infrared light beam (or a full-band light beam) passes. R1, Gb1, and B1 form a second channel through which a visible light beam passes, and R2, Gr2, Gb2, and B2 form another second channel through which a visible light beam passes. In other words, the pixel array shown in FIG. 2 includes four channels in total, and the four channels include two first channels and two second channels. It should be noted that a minimum unit in an image is also referred to as a pixel.

It should be noted that a pixel array includes but is not limited to the following several attributes, and the following several attributes of the pixel array are not limited in this embodiment.

A first attribute is a quantity of a plurality of channels formed by pixels in a pixel array. In addition to the case in which there are four channels in FIG. 2, there may alternatively be three, five, or more channels.

Figure 3:
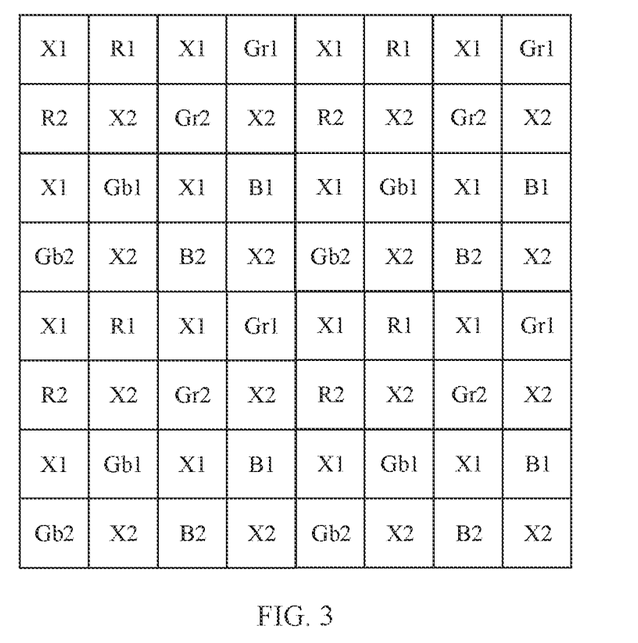
FIG. 3 is a schematic diagram of a pixel array according to an embodiment of this application.

A second attribute is a quantity of pixels in a pixel array. The quantity of pixels in the pixel array is not limited in this embodiment. The array including 16 pixels (4×4 pattern, pattern) shown in FIG. 2 is actually a minimum subarray in the pixel array, and the pixel array may be an array formed by a combination of one or more minimum subarrays. For example, a case shown in FIG. 3 is a pixel array formed by a combination of four minimum subarrays.

Figure 4:
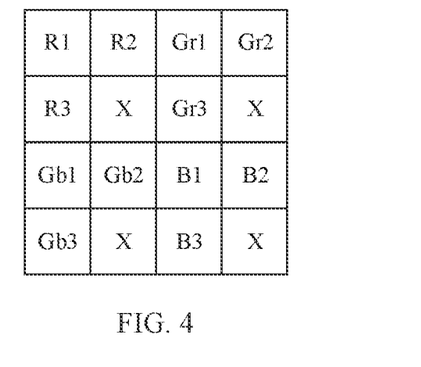
FIG. 4 is a schematic diagram of a pixel array according to an embodiment of this application.

A third attribute is a quantity of first channels and a quantity of second channels in a plurality of channels formed by pixels. For example, there are four channels. In addition to the case in which the four channels include two first channels and two second channels in FIG. 2, the four channels may alternatively include one first channel and three second channels, or three first channels and one second channel. For example, in a case shown in FIG. 4, R1, Gr1, Gb1, and B1 form a $1^{st}$ second channel through which a visible light beam passes, R2, Gr2, Gb2, and B2 form a $2^{nd}$ second channel through which a visible light beam passes, R3, Gr3, Gb3, and B3 form a $3^{rd}$ second channel through which a visible light beam passes, and four X pixels form a first channel through which an infrared light beam passes.

Figure 5:
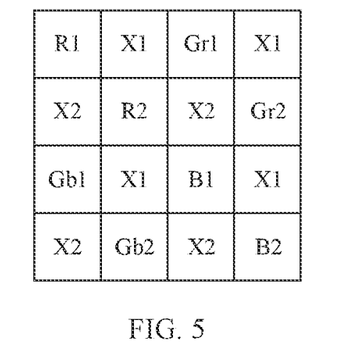
FIG. 5 is a schematic diagram of a pixel array according to an embodiment of this application.

A fourth attribute is an arrangement order of pixels in a pixel array. In the pixel array, R, Gr, Gb, and B pixels may be arranged in any order, and the R, Gr, Gb, and B pixels and X pixels may also be arranged in any order. For example, the pixels included in the pixel array shown in FIG. 2 are the same as pixels included in a pixel array shown in FIG. 5, but arrangement orders of the pixels in the two pixel arrays are different.

Figure 6:
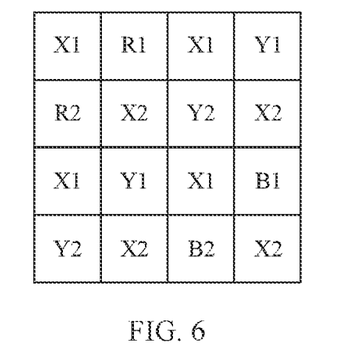
FIG. 6 is a schematic diagram of a pixel array according to an embodiment of this application.
Figure 7:
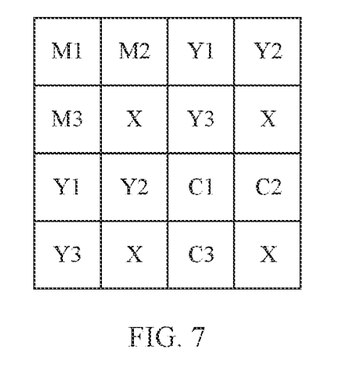
FIG. 7 is a schematic diagram of a pixel array according to an embodiment of this application.

A fifth attribute is a color pattern of color pixels in a pixel array. For a second channel configured to allow a visible light beam to pass through, pixels forming the second channel may use different color patterns. The pixel arrays shown in FIG. 2 to FIG. 5 all use a red green blue (RGB) color pattern. However, in an example embodiment, a pixel array shown in FIG. 6 may alternatively be obtained by using a red yellow blue (RYE) color pattern, or a pixel array shown in FIG. 7 may be obtained by using a cyan magenta yellow (CMY) color pattern.

For example, for the pixel array included in the image sensor 102, each pixel in the pixel array corresponds to a horizontal switch and a vertical switch, horizontal switches corresponding to each row of pixels are controlled by using a horizontal register, and vertical switches corresponding to each column of pixels are controlled by using a vertical register. After the image sensor 102 receives the second light beam, each pixel in the pixel array starts exposure, and the pixel is used to perform photoelectric conversion based on photons in the second light beam, to obtain an analog signal.

In an example embodiment, the image sensor 102 further includes a time sequence control circuit, an analog signal processing element, and an analog-to-digital conversion element. After each pixel starts exposure, the time sequence control circuit controls the horizontal register of each row and the vertical register of each column, so that the horizontal register of each row controls each horizontal switch of the row to be turned on, and the vertical register of each column controls each vertical switch of the column to be turned on. For any pixel, in response to the fact that both a horizontal switch and a vertical switch corresponding to the pixel are turned on, exposure of the pixel stops. Then, an analog signal obtained by performing photoelectric conversion based on the pixel between the start of exposure and the stop of exposure is read. The time sequence control circuit sends the read analog signal to the analog signal processing element, and the analog signal processing element may be configured to perform analog gain on the analog signal, to obtain an analog signal obtained after the analog gain. The analog signal obtained after the analog gain is sent to the analog-to-digital conversion element, and the analog-to-digital conversion element is configured to convert the analog signal obtained after the analog gain into a digital signal. The analog-to-digital conversion element may also perform digital gain on the digital signal obtained through conversion, to use a digital signal obtained after the digital gain as an electrical signal. As described above, the image sensor 102 performs, based on the brightness adjustment parameter corresponding to the first channel, photoelectric conversion on the infrared light beam that is in the second light beam and that is irradiated to the first channel, to obtain an electrical signal, and the obtained electrical signal is the first electrical signal. The image sensor 102 performs, based on the brightness adjustment parameter corresponding to the second channel, photoelectric conversion on the visible light beam that is in the second light beam and that is irradiated to the second channel, to obtain an electrical signal, and the obtained electrical signal is the second electrical signal.

After obtaining the first electrical signal and the second electrical signal, the image sensor 102 further generates an initial image of the target object based on the first electrical signal and the second electrical signal. It should be noted that a quantity of pixels included in the initial image is consistent with a quantity of pixels included in the image sensor 102, and information about each pixel in the initial image is obtained by performing photoelectric conversion on a light beam by using one pixel in the image sensor 102. In other words, the pixels in the image sensor 102 are in a one-to-one correspondence with the pixels in the initial image. Because the color pixels and the X pixels in the image sensor 102 are usually arranged in an interleaved manner, color pixels and X pixels in the initial image are also arranged in an interleaved manner.

For the obtained initial image, the image sensor 102 further needs to send a color image and a grayscale image to the image processor 103 based on the initial image, to help the image processor 103 subsequently perform fusion processing. The color image is an image formed by the color pixels other than the X pixels in the initial image, and the color image is used to provide color information in the subsequent fusion processing. The grayscale image is an image formed by the X pixels in the initial image, and the grayscale image is used to provide brightness information in the subsequent fusion processing. Certainly, an image that can provide brightness information in this embodiment is not limited to the grayscale image. For example, the color image can also provide specific brightness information in the subsequent fusion processing.

It should be noted that a process of obtaining the color image and the grayscale image based on the initial image may be locally performed by the image sensor 102, or the image sensor 102 may send the generated initial image to a digital signal processor (DSP), and the DSP performs the process of obtaining the color image and the grayscale image. Regardless of whether the obtaining process is performed by the image sensor 102 or the DSP element, when the color image is obtained based on the initial image, the X pixels in the initial image may be removed while locations of the color pixels in the initial image remain unchanged, and when the grayscale image is obtained based on the initial image, the color pixels in the initial image may be removed while locations of the X pixels in the initial image remain unchanged.

It should be noted that resolutions of both the color image and the grayscale image are the same as a resolution of the initial image. For example, if the resolution of the initial image is 10×10, that is, the initial image is an image including 10 pixels in each row and 10 pixels in each column, that is, 100 pixels in total, the resolutions of the color image and the grayscale image are also 10×10. However, the color image includes only color pixels. Because the X pixels are removed, an original location of the X pixel is a blank location that does not include any pixel. The grayscale image includes only X pixels, and an original location of the color pixel is a blank location that does not include any pixel.

In addition, the image sensor 102 is electrically connected to the image processor 103. Therefore, after obtaining the initial image, the image sensor 102 may send the obtained color image and grayscale image to the image processor 103 based on the initial image. If the color image and the grayscale image are obtained by splitting the initial image by the image sensor 102, the image sensor 102 directly sends the color image and the grayscale image to the image processor 103. After the image sensor 102 generates the initial image, if the image sensor 102 sends the initial image to the DSP, and the DSP splits the initial image to obtain a color image and a grayscale image, the DSP sends the color image and the grayscale image to the image processor 103.

Correspondingly, the image processor 103 is configured to: receive the color image and the grayscale image, and perform fusion processing on the color image and the grayscale image to obtain a fused image. Because the grayscale image can provide brightness information, the image processor 103 can better obtain color information provided by the color image, so that the obtained color information is relatively rich. Therefore, when the image processor element performs fusion processing based on the grayscale image and the color image, the obtained fused image has a relatively high signal-to-noise ratio and relatively good image quality.

For example, the image processor 103 may be a set of a plurality of processors including an image signal processor (ISP) and a fusion processor, or may be a single processor having both an ISP function and an image fusion function, to implement fusion processing on the color image and the grayscale image. For example, the ISP is configured to perform interpolation processing on the color image and the grayscale image, to obtain a color image and a grayscale image that are obtained after the interpolation processing. Then, the fusion processor is configured to perform fusion processing on the color image and the grayscale image that are obtained after the interpolation processing. Next, two cases of the interpolation processing and fusion processing processes are separately described by using an example in which a color pattern used for a color image is an RGB pattern, that is, the color image includes red pixels, green pixels, and blue pixels.

Case 1: When performing interpolation processing, the ISP first adjusts a color of any pixel in the color image and a grayscale image, to obtain a color image and a grayscale image that are obtained after the interpolation processing. Then, blank locations in the color image and the grayscale image that are obtained after the interpolation processing are supplemented, to obtain a supplemented color image and grayscale image. Then, the fusion processor performs fusion on the supplemented color image and grayscale image, to obtain a fused image.

For any pixel, the ISP may adjust a color of the any pixel based on colors of other pixels around the any pixel. A red pixel in the color image is used as an example, and there are blue pixel and green pixel around the red pixel. Before the interpolation processing is performed, the red pixel includes only red information. When performing the interpolation processing, the ISP performs calculation based on the blue pixel and green pixel around the red pixel to obtain at least one piece of blue information and green information corresponding to the red pixel. Then, at least one piece of the blue information and the green information obtained through the calculation is superimposed on the red pixel. Therefore, the red pixel not only includes the red information, but also fuses the blue information and the green information, so that color information corresponding to the red pixel is richer.

In addition, for any X pixel in the grayscale image, a grayscale value of the any X pixel is also adjusted based on grayscale values of other X pixels around the any X pixel, so that grayscale values corresponding to adjacent X pixels are close to each other, to ensure that brightness information provided by the adjacent X pixels is relatively consistent, and further ensure that a subsequently generated fused image has uniform brightness.

The color image and the gray scale image that are obtained after the interpolation processing may be obtained by performing the foregoing color adjustment process. The color image and the grayscale image that are obtained after the interpolation processing include pixels obtained after the color adjustment and blank locations. Therefore, the ISP further supplements each blank location. For example, for any blank location in a color image or a grayscale image, the ISP determines, based on a color of each pixel around the blank location, a color corresponding to the blank location, to supplement the blank location. It can be learned that a supplemented color image and grayscale image no longer include the blank location. In the color image, because any color pixel around the blank location includes at least two colors, at least two colors correspond to the blank location, so that the blank location has relatively rich color information.

It should be noted that, in the foregoing interpolation processing process, colors of pixels in the color image and the grayscale image are first adjusted, and then blank locations are supplemented based on pixels whose colors are adjusted. For example, in this embodiment, the blank location may also be directly supplemented in a manner of adjusting a color of a pixel. In other words, for any blank location in a color image and a grayscale image, the ISP directly determines a color of the any blank location based on a pixel, whose color is not adjusted, around the any blank location, to supplement the blank location.

As described above, because the resolutions of the color image and the grayscale image are the same, resolutions of the supplemented color image and the grayscale image are also the same, that is, pixels in the supplemented color image and the grayscale image are in a one-to-one correspondence. Therefore, the fusion processor may perform fusion processing on corresponding pixels, to obtain a fused image. It may be understood that, for any pixel in the fused image, the pixel can provide both color information and brightness information.

Case 2: The ISP adjusts a color of any pixel in the color image and a grayscale image, to obtain a color image and a grayscale image that are obtained after the interpolation processing. Then, the fusion processor first supplements blank locations in the color image and the grayscale image that are obtained after the interpolation processing, to obtain a supplemented color image and grayscale image, and then the fusion processor fuses the supplemented color image and the grayscale image, to obtain a fused image.

In an interpolation processing process, for any pixel in the color image and the grayscale image, the ISP adjusts a color of the any pixel based on a color of another pixel around the any pixel. A color adjustment process is the same as the color adjustment process in Case 1. It should be noted that the foregoing interpolation processing is performed only for a pixel that is in a color image and a grayscale image and that is not located in a blank location. For blank locations in the color image and the grayscale image, the ISP element does not perform any adjustment on a color of any blank location based on another pixel around the blank location. In other words, after the interpolation processing is performed, blank locations in the color image and the grayscale image that are obtained after the interpolation processing remain in a blank state.

After performing the interpolation processing, the ISP sends the color image and the grayscale image that are obtained after the interpolation processing to the fusion processor, so that the fusion processor performs fusion processing. The fusion processor first supplements the blank locations in the color image and the grayscale image that are obtained after the interpolation processing, to obtain a supplemented color image and a grayscale image, and then performs fusion on the supplemented color image and the grayscale image. For both supplement and fusion processes, refer to the descriptions in Case 1. Details are not described herein again.

A camera provided in embodiments of this application can separately image an infrared light beam and a visible light beam by using the single image sensor, and does not need to use a light-splitting prism. The camera has a simple structure and is easy to process, which helps improve a yield rate and reduce production costs. In addition, the first channel and the second channel included in the image sensor are independently controlled, and have respective corresponding brightness adjustment parameters. Therefore, the first channel may perform, based on the brightness adjustment parameter corresponding to the first channel, photoelectric conversion on the infrared light beam irradiated on the first channel, to obtain the first electrical signal. Correspondingly, the second channel may also perform, based on the brightness adjustment parameter corresponding to the second channel, photoelectric conversion on the visible light beam irradiated to the second channel, to obtain the second electrical signal. Subsequently, the initial image of the target object may be generated based on the first electrical signal and the second electrical signal, to send the color image and the grayscale image to the image processor based on the initial image. This ensures that the color image generated based on the visible light beam and the grayscale image generated based on the infrared light beam are pixel-level aligned. This can avoid "ghosting" in the generated fused image after the image processor fuses the grayscale image and the color image, and also avoid a case in which different channels affect each other because the different channels use a unified brightness adjustment parameter, so that a high-quality image can be obtained in a low-illuminance environment.

Figure 8:
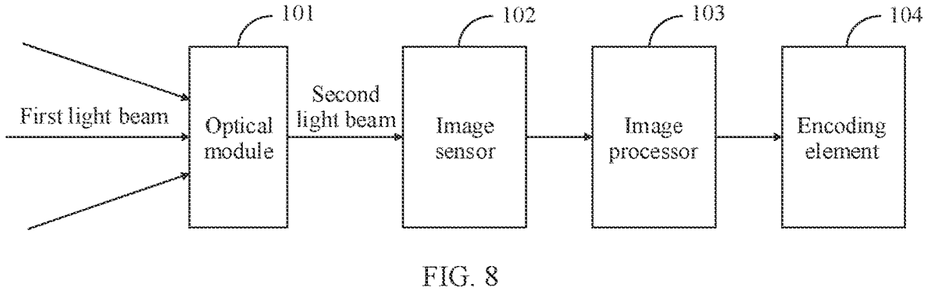
FIG. 8 is a structural diagram of a camera according to an embodiment of this application.

In an example embodiment, refer to FIG. 8, the apparatus may further include an encoding element 104, and the encoding element 104 is electrically connected to the image processor 103. After the image processor 103 obtains the fused image of the target object by, using the fusion processing process, the encoding element 104 may encode the fused image of the target object, or may continue to wait for a subsequent one or more frames of fused images and the fused image of the target object to form a video stream, and then encode the video stream. A function of encoding is to compress an image or a video stream, to reduce a quantity of bytes occupied by the image or the video stream, and facilitate storage and transmission of the image or the video stream.

Figure 9:
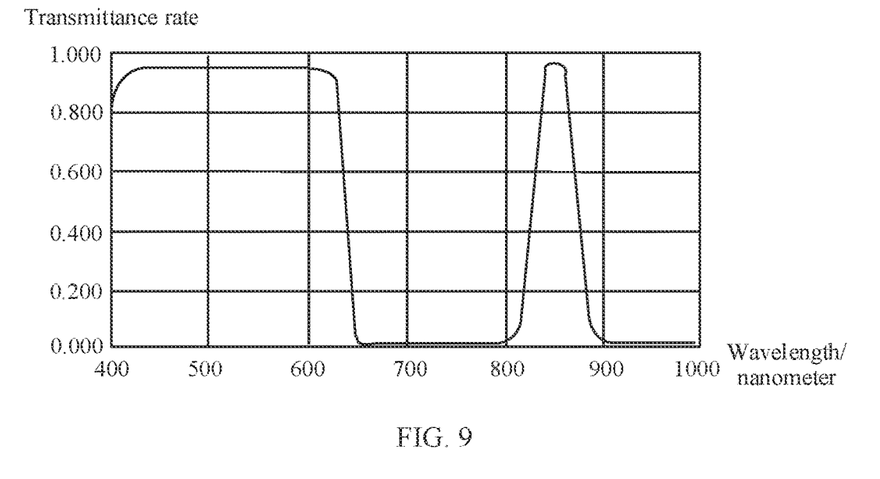
FIG. 9 is a schematic diagram of a response curve according to an embodiment of this application.

In an example embodiment, the optical module 101 includes a band-pass optical filter. The band-pass optical filter is configured to filter the first light beam to obtain the infrared light beam and the visible light beam as the second light beam. The bandpass optical filter is an optical filter that allows only a light beam of a first reference band to pass through. The band-pass optical filter is a two-pass optical filter by setting the first reference band as an infrared light beam band and a visible light beam band. The band-pass optical filter can filter the first light beam to obtain the infrared light beam and the visible light beam, so that the infrared light beam and the visible light beam serve as the second light beam. Therefore, impact caused by a light beam such as an ultraviolet light beam of another band included in the first light beam on subsequent fusion processing is avoided, and quality of an obtained image is ensured. For example, the infrared light beam obtained by filtering the first light beam by the band-pass optical filter may be an infrared light beam of a full infrared band, or may be an infrared light beam of a fixed band, for example, an infrared light beam in a band about 850 nm. For example, for a response curve of the band-pass optical filter, refer to FIG. 9. In FIG. 9, a horizontal coordinate is a wavelength of a light beam, and a vertical coordinate is a transmittance rate of a light beam. It can be learned from FIG. 9 that the band-pass optical filter allows a visible light beam of a wavelength between 400 nm and 600 nm and an infrared light beam in a band near 850 nm to pass through.

Figure 10:
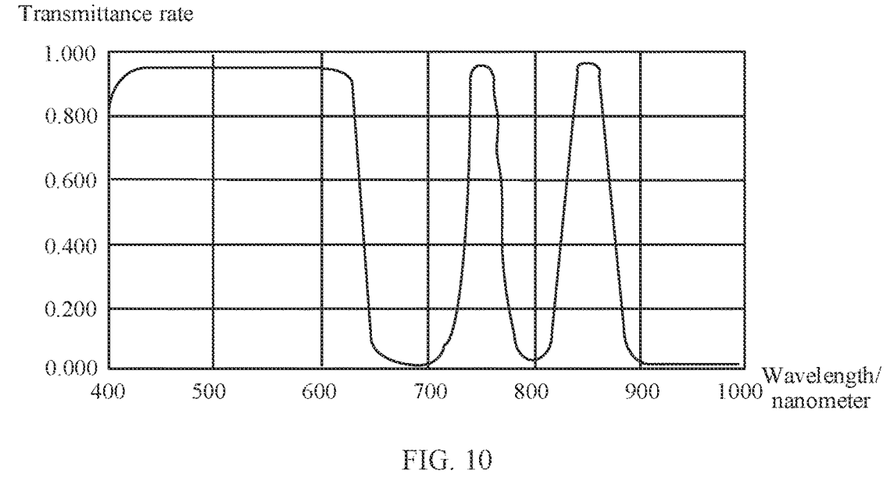
FIG. 10 is a schematic diagram of a response curve according to an embodiment of this application.

In an example embodiment, refer to FIG. 10, the infrared light beam includes a first infrared light beam in a band near 850 nm and a second infrared light beam in a band near 750 nm. That is, the band-pass optical filter allows the visible light beam and the infrared light beams of two different bands to pass through, and the band-pass optical filter is a tri-pass optical filter. It should be noted that, for a target object made of some materials, reflectivity of a material of the target object for the first infrared light beam and the visible light beam is different. As a result, an imaging effect of the target object in the first infrared light beam is different from an imaging effect of the target object in the visible light beam. Because the band of the second infrared light beam is located between the band of the first infrared light beam and the band of the visible light beam, compared with that of the first infrared light beam, the band of the second infrared light beam is closer to the band of the visible light beam. Therefore, imaging the target object under the second infrared light beam can eliminate an imaging difference between the first infrared light beam and the visible light beam, thereby improving image quality of a subsequently obtained image.

It should be noted that the first infrared light beam and the second infrared light beam shown in FIG. 10 are merely examples. In addition to that the band of the first infrared light beam is near 850 nm and the band of the second infrared light beam is near 750 nm, the band of the first infrared light beam and the hand of the second infrared light beam may alternatively be any near-infrared band. The band of the first infrared light beam and the band of the second infrared light beam are not limited in embodiments of this application.

In an example embodiment, the image sensor 102 is further configured to perform, based on the brightness adjustment parameter corresponding to the first channel, photoelectric conversion on the visible light beam that is in the second light beam and that is irradiated to the first channel, to obtain a second electrical signal. In other words, the first channel may not only be configured to allow the infrared light beam to pass through, but also be configured to allow the infrared light beam and the visible light beam to pass through.

Figure 11:
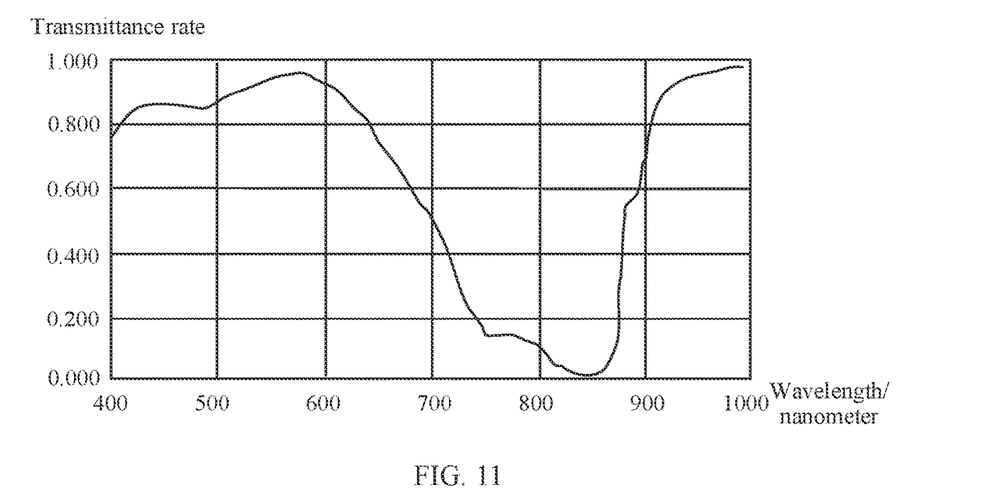
FIG. 11 is a schematic diagram of a response curve according to an embodiment of this application.

In an example embodiment, a band-stop optical filter membrane is disposed on a surface of the image sensor 102, and the band-stop optical filter membrane is configured to shielding the infrared light beam in the second light beam, so that the visible light beam in the second light beam is irradiated to the second channel, and the infrared light beam in the second light beam is prevented from being irradiated to the second channel. The band-stop optical filter membrane is an optical filter membrane configured to prevent a light beam of a second reference band from passing through. By setting the second reference band as a band of the infrared light beam, the band-stop optical filter membrane may shield the infrared light beam in the second light beam. The band-stop optical filter membrane may also be referred to as an infrared light beam suppression (suppress infrared radiation, SIR) optical filter membrane. For example, FIG. 11 shows a response curve of a band-stop optical filter membrane. It can be seen that the band-stop optical filter membrane can shield an infrared light beam in a band between 600 nm and 900 nm. By using the band-stop optical filter membrane, the infrared light beam in the second light beam may be prevented from being irradiated to the second channel. This avoids impact of the infrared light beam in the second channel on the visible light beam, for example, a color cast problem of the visible light beam caused by the infrared light beam.

In an example embodiment, the brightness adjustment parameter includes at least one of exposure duration and a gain. The exposure duration affects a quantity of photons received by each pixel in a channel. On the premise that no overexposure exists, longer exposure duration indicates a larger quantity of photons received by each pixel in the channel, and a higher signal-to-noise ratio and higher definition of a subsequently obtained fused image.

It should be noted that, that a value of the brightness adjustment parameter corresponding to the first channel is different from a value of the brightness adjustment parameter corresponding to the second channel may mean that a type of the brightness adjustment parameter corresponding to the first channel is different from a type of the brightness adjustment parameter corresponding to the second channel. For example, the brightness adjustment parameter corresponding to the first channel is exposure duration, and the brightness adjustment parameter corresponding to the second channel is a gain. Alternatively, the brightness adjustment parameter corresponding to the first channel is a gain, and the brightness adjustment parameter corresponding to the second channel is exposure duration. Alternatively, the brightness adjustment parameter corresponding to the first channel is exposure duration or a gain, and the brightness adjustment parameter corresponding to the second channel is exposure duration and a gain. Alternatively, the brightness adjustment parameter corresponding to the first channel is exposure duration and a gain, and the brightness adjustment parameter corresponding to the second channel is exposure duration or a gain.

In addition to the foregoing cases, that a value of the brightness adjustment parameter corresponding to the first channel is different from a value of the brightness adjustment parameter corresponding to the second channel may alternatively mean that a type of the brightness adjustment parameter corresponding to the first channel is the same as a type of the brightness adjustment parameter corresponding to the second channel, but the values are different. For example, both the brightness adjustment parameter corresponding to the first channel and the brightness adjustment parameter corresponding to the second channel are exposure duration. In this case, the exposure duration corresponding to the first channel may be 10 milliseconds, and the exposure duration corresponding to the second channel may be duration other than 10 milliseconds, for example, 15 milliseconds.

When the exposure duration is used as an example, in a low light scene, the camera receives less visible light, but sufficient infrared light. When exposure duration of a selected color channel (the second channel) is longer than exposure duration of a black-and-white channel (the first channel), the color channel can be fully exposed without causing overexposure of the black-and-white channel. Therefore, an imaging effect of the camera in a low-illuminance environment is improved. Similarly, a gain of the color channel may also be set to be greater than a gain of the black-and-white channel.

In addition, the gain may include at least one of an analog gain and a digital gain. The analog gain indicates amplification of an analog signal, and the digital gain indicates amplification of a digital signal. It should be noted that, in a process of gaining a signal, noise included in the signal is also amplified, to affect quality of an image. Therefore, the gain is often used when the signal is weak and the exposure duration cannot continue to increase.

In an example embodiment, the image processor 103 is further configured to adjust, based on brightness information of the grayscale image, the brightness adjustment parameter corresponding to the first channel, and adjust, based on brightness information of the color image, the brightness adjustment parameter corresponding to the second channel. For example, the brightness adjustment parameter corresponding to the second channel is to be adjusted. Because the second channel is a channel allowing a visible light beam to pass through, an image generated based on the second electrical signal obtained through conversion in the second channel is a color image. In response to a fact that the brightness information of the color image meets a requirement, it indicates that the brightness adjustment parameter corresponding to the second channel is applicable to the current ambient brightness. Therefore, the second channel may continue to use the currently corresponding brightness adjustment parameter to perform photoelectric conversion. In response to a fact that the brightness information of the color image does not meet a requirement, quantitative adjustment needs to be independently performed on the brightness information corresponding to the second channel, to ensure that after photoelectric conversion is performed in the second channel based on an adjusted brightness adjustment parameter, an obtained new second electrical signal can be used to generate, under the current ambient brightness, a color image whose brightness meets the requirement.

It can be learned with reference to the foregoing description that, in response to that the image processor 103 needs to adjust the exposure duration, the image processor 103 may send a signal to the time sequence control circuit in the image sensor 102, so that the time sequence control circuit adjusts time for turning on the horizontal switch and the vertical switch by the horizontal register and the vertical register, to change exposure duration of each pixel in the channel that needs to be adjusted. For example, the signal sent by the image processor 103 to the time sequence control circuit in the image sensor 102 may be a register value corresponding to the horizontal register and a register value corresponding to the vertical register. The horizontal register and the vertical register respectively adjust, based on the respective register values corresponding to the horizontal register and the vertical register, the time for turning on the horizontal switch and the vertical switch. In response to a fact that the image processor 103 needs to adjust an analog gain, the image processor 103 may send a signal to the analog signal processing element in the image sensor 102, so that the analog signal processing element adjusts an analog gain multiple for the analog signal. In response to a fact that the image processor 103 needs to adjust a digital gain, the image processor 103 may send a signal to the analog-to-digital conversion element in the image sensor 102, so that the analog-to-digital conversion element adjusts a digital gain multiple for the digital signal.

Figure 12:
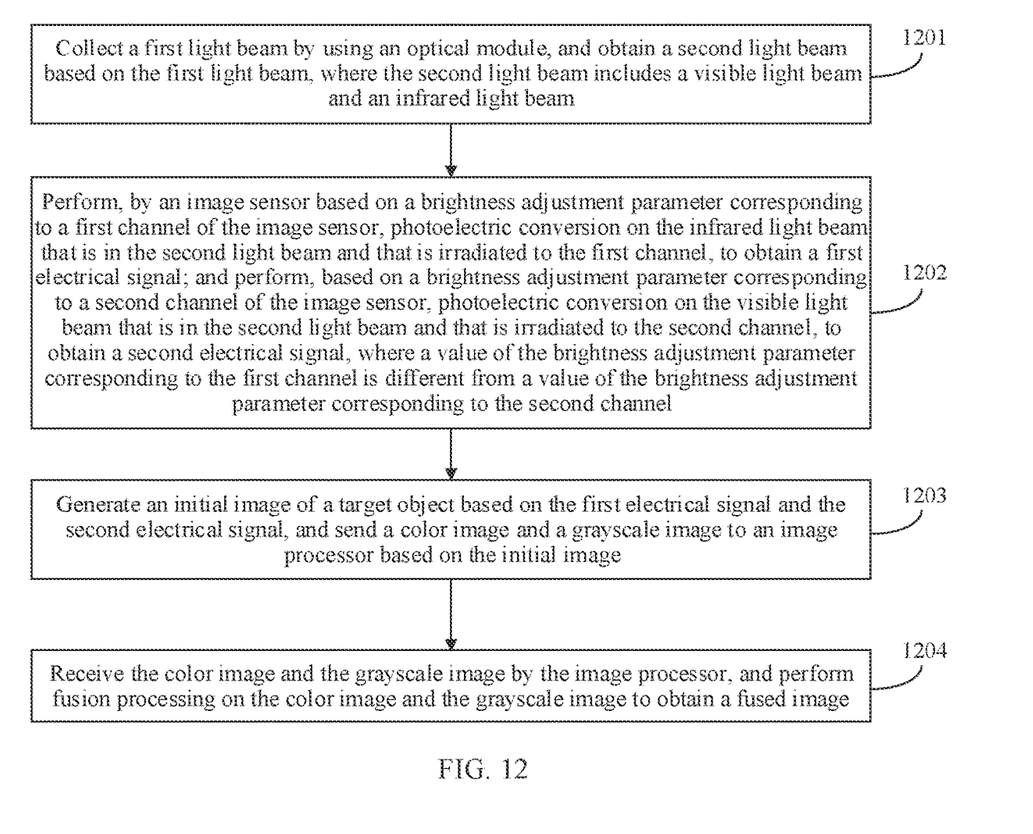
FIG. 12 is a flowchart of an image obtaining method according to an embodiment of this application.

Based on the camera shown in FIG. 1 or FIG. 8, an embodiment provides an image obtaining method. Refer to FIG. 12, and the method includes the following steps.

Step 1201: Collect a first light beam by using an optical module, and obtain a second light beam based on the first light beam, where the second light beam includes a visible light beam and an infrared light beam.

A target object whose image is to be shot may reflect a light beam or directly emit a light beam. As shown in FIG. 1 or FIG. 8, the reflected light beam or the directly emitted light beam may be used as the first light beam by using the optical module 101. Then, the second light beam including the visible light beam and the infrared light beam is obtained based on the first light beam. In response to a fact that the first light beam includes only a visible light beam and an infrared light beam, the first light beam may be directly used as the second light beam. In response to a fact that the first light beam includes, in addition to a visible light beam and an infrared light beam, another light beam that may affect image obtaining, the second light beam needs to be obtained by filtering the first light beam. In other words, in an example embodiment, the step of obtaining a second light beam based on the first light beam includes: filtering the first light beam to obtain an infrared light beam and a visible light beam as the second light beam. For example, the foregoing filtering process may be implemented by using the band-pass optical filter in the optical module 101.

In an example embodiment, the infrared light beam includes a first infrared light beam in a band near 850 nm and a second infrared light beam in a band near 750 nm. In other words, the bands of the visible light beam, the second infrared light beam, and the first infrared light beam increase successively. Light compensation is performed on the visible light beam by using two infrared light beams of different bands, so that a light compensation effect is relatively good and definition of a subsequently obtained image is ensured.

Step 1202: Perform, by an image sensor based on a brightness adjustment parameter corresponding to a first channel of the image sensor, photoelectric conversion on the infrared light beam that is in the second light beam and that is irradiated to the first channel, to obtain a first electrical signal; and perform, based on a brightness adjustment parameter corresponding to a second channel of the image sensor, photoelectric conversion on the visible light beam that is in the second light beam and that is irradiated to the second channel, to obtain a second electrical signal, where a value of the brightness adjustment parameter corresponding to the first channel is different from a value of the brightness adjustment parameter corresponding to the second channel.

Both the first channel and the second channel are channels that are included in the image sensor and that can be independently controlled, each channel corresponds to a brightness adjustment parameter, and brightness adjustment parameters corresponding to different channels may be different. In addition, each channel includes a plurality of pixels, and pixels of different channels are different. Certainly, according to a requirement, in this embodiment, a value of the brightness adjustment parameter corresponding to the first channel and a value of the brightness adjustment parameter corresponding to the second channel may also be a same value, and are not limited to different values.

In an example embodiment, the brightness adjustment parameter corresponding to the first channel and the brightness adjustment parameter corresponding to the second channel each include at least one of exposure duration and a gain. For any channel, the exposure duration affects a quantity of photons received by each pixel in a channel. On the premise that no overexposure occurs, longer exposure duration indicates a larger quantity of photons received by each pixel, a higher signal-to-noise ratio of a subsequently obtained image, and a clearer image. Gains include an analog gain and a digital gain. The essence of the two types of gains is to amplify signals.

It should be noted that, because types of light beams that are used to pass through the channels are different, brightness adjustment parameters applicable to the channels are also different. For example, the brightness adjustment parameter is exposure duration. In a low-illuminance environment with relatively low illuminance, exposure duration used by the first channel that is configured to allow the infrared light beam to pass through is relatively short. Otherwise, an overexposure phenomenon occurs on the first channel. However, for the second channel configured to allow the visible light beam to pass through, because illuminance is relatively low and a quantity of photons included in the light is relatively small, relatively long exposure duration is applicable, it can be seen that, if the first channel and the second channel use the same brightness adjustment parameter, the second channel configured to allow the visible light beam to pass through needs to accommodate the first channel configured to allow the infrared light beam to pass through, and both the first channel and the second channel need to use relatively short exposure duration to avoid overexposure of the first channel configured to allow the infrared light beam to pass through. The relatively short exposure duration causes a relatively small quantity of photons obtained through the second channel configured to allow the visible light beam to pass through, and relatively poor quality of a subsequently obtained image.

However, in this embodiment, because the first channel and the second channel may be independently controlled, both the first channel and the second channel may use brightness adjustment parameter information applicable to the channels. The low light scene in the foregoing example is still used as an example. In this case, the brightness adjustment parameter corresponding to the first channel configured to allow the infrared light beam to pass through may be relatively short exposure duration, to avoid overexposure, and the brightness adjustment parameter corresponding to the second channel configured to allow the visible light beam to pass through may be relatively long exposure duration, to ensure that a sufficient quantity of photons can be obtained. In this manner of independently controlling a channel, a high-quality color image with uniform brightness and a relatively high signal-to-noise ratio can be obtained in the low light scene.

In addition to a case in which the first channel configured to allow the infrared light beam to pass through and the second channel configured to allow the visible light beam to pass through respectively use different brightness adjustment parameters, different first channels configured to allow infrared light beams to pass through may also use different brightness adjustment parameters, and different second channels configured to allow visible light beams to pass through may also use different brightness adjustment parameters. For example, when a quantify of the first channels configured to allow the infrared light beams to pass through is more than two, the more than two first channels may respectively use different brightness adjustment parameters. For example, one first channel configured to allow the infrared light beam to pass through uses relatively short exposure duration, and the other first channel configured to allow the infrared light beam to pass through uses relatively long exposure duration. The two first channels may alternatively respectively use different gains. In this way, both a target object at a relatively bright close place and a target object at a relatively dark remote place can obtain sufficient brightness, and brightness of the two target objects can be consistent with each other, so that an image with a relatively high signal-to-noise ratio and uniform brightness is obtained.

Certainly, in the method provided in this embodiment, a same brightness adjustment parameter may also be used for each channel. For example, when a distance between a target object and the apparatus is relatively long, a brightness adjustment parameter corresponding to each channel may be relatively long exposure duration. Correspondingly, when the distance between the target object and the apparatus is relatively short, the brightness adjustment parameter corresponding to each channel may be relatively short exposure duration.

In an example embodiment, after the obtaining a second light beam based on the first light beam, the method further includes: performing, by using the image sensor based on the brightness adjustment parameter corresponding to the first channel, photoelectric conversion on the visible light beam that is in the second light beam and that is irradiated to the first channel, to obtain a second electrical signal. In other words, the first channel may be configured to perform photoelectric conversion only on the infrared light beam, or may be configured to perform photoelectric conversion on both the infrared light beam and the visible light beam.

In an example embodiment, a band-stop optical filter membrane is disposed on a surface of the image sensor. The performing, based on a brightness adjustment parameter corresponding to a second channel of the image sensor, photoelectric conversion on the visible light beam that is in the second light beam and that is irradiated to the second channel, to obtain a second electrical signal includes: shielding the infrared light beam in the second light beam by the band-stop optical filter membrane, so that the visible light beam in the second light beam is irradiated to the second channel, and the infrared light beam in the second light beam is prevented from being irradiated to the second channel. When the second light beam is propagated to the band-stop optical filter membrane, only the visible light beam in the second light beam can pass through the band-stop optical filter membrane and be irradiated to the second channel, and the infrared light beam in the second light beam is shielded by the band-stop optical filter membrane and cannot be irradiated to the second channel. In this way, the performing, based on the brightness adjustment parameter corresponding to the second channel, photoelectric conversion on only the visible light beam that is in the second light beam and that is irradiated to the second channel, to obtain the second electrical signal is implemented.

Step 1203: Generate an initial image of the target object based on the first electrical signal and the second electrical signal, and send a color image and a grayscale image to an image processor based on the initial image.

The image sensor generates the initial image of the target object based on the first electrical signal and the second electrical signal. Because the first electrical signal is a signal obtained by performing photoelectric conversion on the infrared light beam, and the second electrical signal is a signal obtained by performing photoelectric conversion on the visible light beam, the initial image generated based on the first electrical signal and the second electrical signal includes both brightness information provided by the infrared light beam and color information provided by the visible light beam. Certainly, information that can be provided by the visible light beam is not limited to color information. For example, the visible light beam can also provide specific brightness information.

Therefore, a color image used to reflect color information and a grayscale image used to reflect brightness information may be further obtained based on the initial image. A process of obtaining the color image and the grayscale image may be locally executed by the image sensor, or may be executed by a DSP other than the image sensor. An execution body is not limited in this embodiment. Regardless of which execution body is used to obtain the color image and the gray scale image, the obtained color image and the grayscale image may be further sent to the image processor, so that the image processor performs fusion processing.

Step 1204: Receive the color image and the grayscale image by the image processor, and perform fusion processing on the color image and the grayscale image to obtain a fused image.

The image processor first performs interpolation processing on the color image and the grayscale image to obtain a color image and a grayscale image that are obtained through the interpolation processing, and then performs fusion on the color image and the grayscale image that are obtained through the interpolation processing, to obtain a fused image of the target object. The fused image is an image with a relatively high signal-to-noise ratio and uniform brightness. In an example embodiment, after the performing fusion processing on the color image and the grayscale image to obtain a fused image, the method further includes: adjusting, based on brightness information of the grayscale image, the brightness adjustment parameter corresponding to the first channel, and adjusting, based on brightness information of the color image, the brightness adjustment parameter corresponding to the second channel.

The image processor may analyze the brightness information of the grayscale image and the brightness information of the color image, to adjust the brightness adjustment parameters of the first channel and the second channel based on analysis results. For example, when brightness indicated by the brightness information of the color image is relatively low, the image processor may increase exposure duration corresponding to the second channel, to obtain a larger quantity of photons by using the second channel, and improve brightness and a signal-to-noise ratio of the image. For another example, when overexposure occurs on the grayscale image, the image processor may shorten the exposure duration corresponding to the first channel, to obtain a grayscale image with normal exposure.

It may be understood that a process in which the image processor adjusts the brightness adjustment parameter corresponding to each channel may be iteratively performed for multiple times in a process of obtaining the fused image. An occasion for adjusting the brightness adjustment parameter is not limited in this embodiment. For example, each time the image processor obtains a reference quantity of frames of images, the image processor may perform analysis based on the last obtained frame of image in the reference quantity of frames of images, to adjust a brightness adjustment parameter corresponding to each channel once. Alternatively, the last obtained frame of image may be analyzed at intervals of reference duration, to adjust a brightness adjustment parameter corresponding to each channel once. Alternatively, when it is detected that a quality change of an image exceeds a threshold, it may be determined that illuminance of an ambient environment changes greatly, to adjust a brightness adjustment parameter corresponding to each channel once.

In conclusion, the camera provided in embodiments of this application can separately image an infrared light beam and a visible light beam by using a single image sensor, and does not need to use a light-splitting prism. In addition, the first channel and the second channel included in the image sensor may be independently controlled, and have respective corresponding brightness adjustment parameters. Therefore, in the first channel, photoelectric conversion may be performed, based on the brightness adjustment parameter corresponding to the first channel, on the infrared light beam irradiated on the first channel, to obtain the first electrical signal, Correspondingly, in the second channel, photoelectric conversion may be performed, based on the brightness adjustment parameter corresponding to the second channel, on the visible light beam irradiated to the second channel, to obtain the second electrical signal; and in the second channels configured to allow the visible light beams to pass through, photoelectric conversion may be performed, based on the respective corresponding brightness adjustment parameters, on the visible light beam irradiated to the second channel, to obtain the second electrical signals. Subsequently, the initial image of the target object may be generated based on the first electrical signal and the second electrical signal, to send the color image and the grayscale image to the image processor based on the initial image. This ensures that the color image generated based on the visible light beam and the grayscale image generated based on the infrared light beam are pixel-level aligned. This can avoid "ghosting" in the generated fused image after the image processor fuses the grayscale image and the color image, and also avoid a case in which different channels affect each other because the different channels use a unified brightness adjustment parameter, so that a high-quality image can be obtained in a low-illuminance environment.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid-state drive).

The foregoing descriptions are merely embodiments of this application, but are not intended to limit this application. Any modification, equivalent replacement, or improvement made without departing from the spirit and principle of this application should fall within the protection scope of this application.

What is claimed is:

1. A camera, wherein the camera comprises an optical module, a single image sensor, and an image processor, the image sensor is electrically connected to the image processor, the image sensor comprises at least one first channel and at least one second channel, each of the at least one first channel and the at least one second channel comprises a plurality of pixels, and each of the at least one first channel and each of the at least one second channel have at least one different pixel, and wherein:
   the optical module is configured to collect a first light beam and send a second light beam to the image sensor based on the first light beam, and the second light beam comprises a visible light beam and an infrared light beam;
   the image sensor is configured to:
      perform, based on a brightness adjustment parameter corresponding to the first channel, photoelectric conversion on the infrared light beam that is in the second light beam and that is irradiated to the first channel, to obtain a first electrical signal;
      perform, based on a brightness adjustment parameter corresponding to the second channel, photoelectric conversion on the visible light beam that is in the second light beam and that is irradiated to the second channel, to obtain a second electrical signal, wherein the brightness adjustment parameter comprises an exposure duration, and wherein a value of the exposure duration corresponding to the first channel is different from a value of the exposure duration corresponding to the second channel;
generate an initial image based on the first electrical signal and the second electrical signal; and
send a color image and a grayscale image to the image processor based on the initial image; and
the image processor is configured to:
receive the color image and the grayscale image; and
perform fusion processing on the color image and the grayscale image to obtain a fused image.

2. The camera according to claim 1, wherein the optical module comprises a band-pass optical filter, and wherein
the band-pass optical filter is configured to filter the first light beam to obtain the infrared light beam and the visible light beam as the second light beam.

3. The camera according to claim 2, wherein the infrared light beam comprises a first infrared light beam in a band near 850 nm and a second infrared light beam in a band near 750 nm.

4. The camera according to claim 1, wherein the image sensor is further configured to perform, based on the brightness adjustment parameter corresponding to the first channel, photoelectric conversion on the visible light beam that is in the second light beam and that is irradiated to the first channel, to obtain the second electrical signal.

5. The camera according to claim 4, wherein a band-stop optical filter membrane is disposed on a surface of the image sensor, and the band-stop optical filter membrane is configured to shield the infrared light beam in the second light beam to allow the visible light beam in the second light beam to be irradiated to the second channel.

6. The camera according to claim 1, wherein the image processor is further configured to:
adjust, based on brightness information of the grayscale image, the brightness adjustment parameter corresponding to the first channel; and
adjust, based on brightness information of the color image, the brightness adjustment parameter corresponding to the second channel.

7. The camera according to claim 1, wherein the brightness adjustment parameter comprises a gain.

8. An image obtaining method, wherein the method comprises:
collecting a first light beam by using an optical module;
obtaining a second light beam based on the first light beam, wherein the second light beam comprises a visible light beam and an infrared light beam;
performing, by an image sensor based on a brightness adjustment parameter corresponding to a first channel of the image sensor, photoelectric conversion on the infrared light beam that is in the second light beam and that is irradiated to the first channel, to obtain a first electrical signal;
performing, based on a brightness adjustment parameter corresponding to a second channel of the image sensor, photoelectric conversion on the visible light beam that is in the second light beam and that is irradiated to the second channel, to obtain a second electrical signal, wherein the brightness adjustment parameter comprises an exposure duration, wherein a value of the exposure duration corresponding to the first channel is different from a value of the exposure duration corresponding to the second channel;
generating an initial image based on the first electrical signal and the second electrical signal;
sending a color image and a grayscale image to an image processor based on the initial image, wherein each of the first channel and the second channel comprises a plurality of pixels, and the first channel and the second channel have at least one different pixel;
receiving, by the image processor, the color image and the grayscale image; and
performing fusion processing on the color image and the grayscale image to obtain a fused image.

9. The method according to claim 8, wherein the optical module comprises a band-pass optical filter, and the obtaining a second light beam based on the first light beam comprises:
filtering, by the band-pass optical filter, the first light beam to obtain the infrared light beam and the visible light beam as the second light beam.

10. The method according to claim 8, wherein a band-stop optical filter membrane is disposed on a surface of the image sensor, and the infrared light beam in the second light beam is shielded by the band-stop optical filter membrane to allow the visible light beam in the second light beam to be irradiated to the second channel.

11. The method according to claim 8, wherein after the performing fusion processing on the color image and the grayscale image to obtain a fused image, the method further comprises:
adjusting, based on brightness information of the grayscale image, the brightness adjustment parameter corresponding to the first channel; and
adjusting, based on brightness information of the color image, the brightness adjustment parameter corresponding to the second channel.

12. The method according to claim 8, wherein the brightness adjustment parameter comprises a gain.

13. The method according to claim 9, wherein the infrared light beam comprises a first infrared light beam in a band near 850 nm and a second infrared light beam in a band near 750 nm.

14. A non-transitory computer-readable storage medium storing programming instructions for execution by at least one processor, that when executed by the at least one processor, cause a camera to perform operations comprising:
collecting a first light beam by using an optical module;
obtaining a second light beam based on the first light beam, wherein the second light beam comprises a visible light beam and an infrared light beam;
performing, by an image sensor based on a brightness adjustment parameter corresponding to a first channel of the image sensor, photoelectric conversion on the infrared light beam that is in the second light beam and that is irradiated to the first channel, to obtain a first electrical signal;
performing, based on a brightness adjustment parameter corresponding to a second channel of the image sensor, photoelectric conversion on the visible light beam that is in the second light beam and that is irradiated to the second channel, to obtain a second electrical signal, wherein the brightness adjustment parameter comprises an exposure duration, wherein a value of the exposure duration corresponding to the first channel is different from a value of the exposure duration corresponding to the second channel;
generating an initial image based on the first electrical signal and the second electrical signal;
sending a color image and a grayscale image to an image processor based on the initial image, wherein each of the first channel and the second channel comprises a plurality of pixels, and the first channel and the second channel have at least one different pixel;

receiving, by the image processor, the color image and the grayscale image; and performing fusion processing on the color image and the grayscale image to obtain a fused image.

15. The non-transitory computer-readable storage medium according to claim 14, wherein the optical module comprises a band-pass optical filter, and the obtaining a second light beam based on the first light beam comprises:

filtering, by the band-pass optical filter, the first light beam to obtain the infrared light beam and the visible light beam as the second light beam.

16. The non-transitory computer-readable storage medium according to claim 14, wherein a band-stop optical filter membrane is disposed on a surface of the image sensor, and the infrared light beam in the second light beam is shielded by the band-stop optical filter membrane to allow the visible light beam in the second light beam to be irradiated to the second channel.

17. The non-transitory computer-readable storage medium according to claim 14, wherein after the performing fusion processing on the color image and the grayscale image to obtain a fused image, the operations further comprise:

adjusting, based on brightness information of the grayscale image, the brightness adjustment parameter corresponding to the first channel; and adjusting, based on brightness information of the color image, the brightness adjustment parameter corresponding to the second channel.

18. The non-transitory computer-readable storage medium according to claim 14, wherein the brightness adjustment parameter comprises a gain.

19. The non-transitory computer-readable storage medium according to claim 15, wherein the infrared light beam comprises a first infrared light beam in a band near 850 nm and a second infrared light beam in a band near 750 nm.

* * * * *

UNITED STATES PATENT AND TRADEMARK OFFICE
CERTIFICATE OF CORRECTION

| | | |
|---|---|---|
| PATENT NO. | : 12,108,197 B2 | Page 1 of 1 |
| APPLICATION NO. | : 17/974302 | |
| DATED | : October 1, 2024 | |
| INVENTOR(S) | : Jun Liu et al. | |

It is certified that error appears in the above-identified patent and that said Letters Patent is hereby corrected as shown below:

On the Title Page

In Column 2 (Item (56) Other Publications), In Line 1, Delete "AppIn No." and insert -- Appln No. --.

Signed and Sealed this
Fourth Day of March, 2025

Coke Morgan Stewart
*Acting Director of the United States Patent and Trademark Office*